US010681687B2

(12) United States Patent
Davydov et al.

(10) Patent No.: US 10,681,687 B2
(45) Date of Patent: Jun. 9, 2020

(54) USER EQUIPMENT AND BASE STATION CONFIGURED FOR APERIODIC CSI REFERENCES SIGNALS(CSI-RS) WITH APERIODIC REPORT TRIGGERING

(71) Applicant: Intel Corporation, Santa Clara, CA (US)

(72) Inventors: Alexei Davydov, Nizhny Novgorod (RU); Vadim Sergeyev, Nizhny Novgorod (RU); Gregory Morozov, Nizhny Novgorod (RU); Ilya Bolotin, Nizhny-Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/032,704

(22) Filed: Jul. 11, 2018

(65) Prior Publication Data

US 2019/0014559 A1    Jan. 10, 2019

Related U.S. Application Data (63) Continuation of application No. 14/707,242, filed on May 8, 2015, now Pat. No. 10,034,277.
(Continued)

(51) Int. Cl.
*H04W 24/08* (2009.01)
*H04W 72/04* (2009.01)
*H04L 5/00* (2006.01)
*H04B 7/06* (2006.01)
*H04L 29/08* (2006.01)

(52) U.S. Cl.
CPC ........ *H04W 72/042* (2013.01); *H04B 7/0626* (2013.01); *H04L 5/00* (2013.01);
(Continued)

(58) Field of Classification Search
None
See application file for complete search history.

(56) References Cited

U.S. PATENT DOCUMENTS 9,591,590 B2 * 3/2017 Chen .................... H04W 52/143
9,838,177 B2 * 12/2017 Sun ........................ H04B 7/024
(Continued)

FOREIGN PATENT DOCUMENTS

WO    WO-2014071638 A1 *  5/2014
WO    WO-2014071638 A1     5/2014
(Continued)

OTHER PUBLICATIONS

"European Application Serial No. 15878278.9, Response filed Feb. 27, 2019 to Extended European Search Report dated Aug. 9, 2018", 34 pgs.
(Continued)

*Primary Examiner* — Sithu Ko
(74) *Attorney, Agent, or Firm* — Kowert, Hood, Munyon, Rankin & Goetzel, P.C.

(57) ABSTRACT

Dynamic transmission of non-zero power channel state information resource signals and interference measurement resources is described. Such dynamic transmission reduces or eliminates a need to buffer and store channel and interference measurements The described approach also reduces the overhead due to transmission of those resources and enables flexible time-domain channel state information requests.

20 Claims, 4 Drawing Sheets

Related U.S. Application Data (60) Provisional application No. 62/104,185, filed on Jan. 16, 2015.

(52) U.S. Cl.
CPC ............ *H04L 5/005* (2013.01); *H04L 5/0035* (2013.01); *H04L 5/0053* (2013.01); *H04L 5/0094* (2013.01); *H04L 69/323* (2013.01)

(56) References Cited

U.S. PATENT DOCUMENTS

| | | | |
|---|---|---|---|
| 10,034,277 | B2 | 7/2018 | Davydov et al. |
| 10,187,135 | B2 * | 1/2019 | Kim ...................... H04B 7/0626 |
| 10,225,054 | B2 * | 3/2019 | Shin ...................... H04L 5/0051 |
| 2014/0036796 | A1 * | 2/2014 | Etemad ................... H04W 4/70 370/329 |
| 2014/0044076 | A1 | 2/2014 | Etemad et al. |
| 2014/0078919 | A1 | 3/2014 | Hammarwall |
| 2014/0126402 | A1 | 5/2014 | Nam et al. |
| 2015/0049626 | A1 * | 2/2015 | Chen ..................... H04W 24/08 370/252 |
| 2015/0162966 | A1 * | 6/2015 | Kim ......................... H04L 1/20 370/252 |
| 2015/0244444 | A1 * | 8/2015 | Mazzarese ............... H04B 7/04 370/252 |
| 2015/0263796 | A1 * | 9/2015 | Nam ..................... H04B 7/0417 370/329 |
| 2015/0312927 | A1 * | 10/2015 | Ko .......................... H04L 5/005 370/336 |
| 2016/0212733 | A1 | 7/2016 | Davydov et al. |

FOREIGN PATENT DOCUMENTS

| | | |
|---|---|---|
| WO | WO-2014142571 A1 | 9/2014 |
| WO | WO-2016114868 A1 | 7/2016 |

OTHER PUBLICATIONS

"U.S. Appl. No. 14/707,242, Examiner Interview Summary dated Aug. 23, 2016", 3 pgs.

"U.S. Appl. No. 14/707,242, Final Office Action dated Jun. 9, 2016", 21 pgs.

"U.S. Appl. No. 14/707,242, Final Office Action dated Oct. 20, 2017", 21 pgs.

"U.S. Appl. No. 14/707,242, Non Final Office Action dated Jan. 21, 2016", 20 pgs.

"U.S. Appl. No. 14/707,242, Non Final Office Action dated May 11, 2017", 25 pgs.

"U.S. Appl. No. 14/707,242, Notice of Allowance dated Mar. 27, 2018", 12 pgs.

"U.S. Appl. No. 14/707,242, Response filed Jan. 22, 2018 to Final Office Action dated Oct. 20, 2017", 8 pgs.

"U.S. Appl. No. 14/707,242, Response filed Apr. 21, 2016 to Non Final Office Action dated Jan. 21, 2016", 11 pgs.

"U.S. Appl. No. 14/707,242, Response filed Aug. 11, 2017 to Non Final Office Action dated May 11, 2017", 10 pgs.

"U.S. Appl. No. 14/707,242, Response filed Sep. 8, 2016 to Final Office Action dated Jun. 9, 2016", 9 pgs.

"Discussion on CSI reporting for Inter eNB CoMP", Ericsson, R3-142432, 3GPP TSG-RAN WG3 Meeting #85bis, (Sep. 27, 2014), 4 pgs.

"Discussion on the remaining details of CSI Feedback for eIMTA", 3GPP Draft; RI-141551 Remaining Details of CSI for EIMTA, 3rd Generation Partnership Project (3GPP), Mobile Competence Centre; 650, Route Des Lucioles ; F06921 Sophia-Antipolis Cedex ; France vol. RAN WG1, No. Shenzhen, China, (Mar. 30, 2014), 4 pgs.

"European Application Serial No. 15878278.9, Extended European Search Report dated Aug. 9, 2018", 14 pgs.

"International Application Serial No. PCT/US2015/064751, International Preliminary Report on Patentability dated Jul. 27, 2017", 14 pgs.

"International Application Serial No. PCT/US2015/064751, International Search Report dated Mar. 22, 2016", 6 pgs.

"International Application Serial No. PCT/US2015/064751, Written Opinion dated Mar. 22, 2016", 12 pgs.

"Remaining issues on CSI feedback for eIMTA", Samsung, R1-140347, 3GPP TSG RAN WGl #76, (Feb. 9, 2014), 4 pgs.

* cited by examiner

USER EQUIPMENT AND BASE STATION CONFIGURED FOR APERIODIC CSI REFERENCES SIGNALS(CSI-RS) WITH APERIODIC REPORT TRIGGERING

PRIORITY CLAIM

This application is a continuation of U.S. patent application Ser. No. 14/707,242, filed May 8, 2015, issued as U.S. Pat. No. 10,034,277, which claims the benefit of priority to U.S. Provisional Patent Application Ser. No. 62/104,185, filed Jan. 16, 2015, each of which are incorporated herein by reference in their entirety

TECHNICAL FIELD

Embodiments pertain to wireless communications. Some embodiments relate to cellular networks including networks operating in accordance with the 3GPP LTE and LTE-A standards. Some embodiments relate to 5G cellular networks.

BACKGROUND

In LTE (Long Term Evolution, including Long Term Evolution-Advanced or LTE-A) systems as standardized by the specifications of the 3$^{rd}$ Generation Partnership Project (3GPP), a base station (an evolved Node B or eNB in LTE terminology) performs channel-dependent scheduling and link adaptation where the transmission parameters used to transmit data to a terminal (a user equipment or UE in LTE terminology), such as transmission power and the modulation and coding scheme (MCS), are dynamically adjusted. For this purpose, a UE provides the eNB with channel state information (CSI) in the form of CSI reports. Accurate reporting of CSI by the UE is essential for effective link adaptation of the downlink. Precise knowledge of the downlink channels is also used in coordinated multi-point (CoMP) operations, where CoMP refers to a system where the downlink transmissions from multiple, geographically separated antenna sites are coordinated in order to improve system performance. The primary concern of the present disclosure is the manner in which reference signals for CSI reporting are transmitted to the UE.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The physical layer of LTE is based upon orthogonal frequency division multiplexing (OFDM) for the downlink and a related technique, single carrier frequency division multiplexing (SC-FDM), for the uplink. In OFDM, complex modulation symbols according to a modulation scheme such as QAM (quadrature amplitude modulation) are each individually mapped to a particular OFDM subcarrier transmitted during an OFDM symbol, referred to as a resource element (RE). An RE is the smallest time-frequency resource in LTE and is uniquely identified by antenna port, sub-carrier position, and OFDM symbol index. A group of resource elements corresponding to twelve consecutive subcarriers within a single 0.5 ms slot is referred to as a resource block (RB), and two consecutive slots make up a 1 ms LTE subframe. Time-frequency resources for the uplink and downlink are dynamically scheduled by the eNB for each UE in terms of RB pairs.

The LTE air interface, also referred to as the radio access network (RAN), has a protocol architecture that may be basically described as follows. In the control plane, the radio resource control (RRC) layer is in control of radio resource usage and communicates with the packet data compression protocol (PDCP) layer via signaling radio bearers. In the user plane, the PDCP layer receives radio bearers to which are mapped IP (internet protocol) packets. The PDCP layer communicates with the radio link control (RLC) layer via the radio bearers, and the RLC layer communicates with the medium access control (MAC) layer through logical channels. The MAC layer communicates via transport channels with the physical layer (PHY). The primary transport channels used for the transmission of data, the uplink shared channel (UL-SCH) and downlink shared channel (DL-SCH), are mapped to the physical uplink shared channel (PUSCH) and physical downlink shared channel (PDSCH), respectively, at the physical layer. There are also physical channels without a corresponding transport channel that are used for physical layer control signaling. These channels include the physical downlink control channel (PDCCH) and enhanced physical downlink control channel (EPDCCH) used to transmit downlink control information (DCI) from the eNB to the UE and the physical uplink control channel (PUCCH) used to transmit uplink control information (UCI) from the UE to the eNB.

CoMP involves multiple transmission points or cells coordinating their individual transmissions so that a target UE experiences enhanced signal reception and/or reduced interference. A TP of a cell participating in CoMP may be a base station, referred to as an evolved Node B (eNB) in LTE, or may be a remote radio head (RRH) operated by an eNB. Techniques for performing CoMP may be broadly classified into two categories: coordinated scheduling and coordinated beamforming (CS/CB) and joint transmission (JT). CS/CB involves multiple coordinated cells sharing channel state information (CSI) for multiple UEs, while the user plane data that is transmitted to a particular UE is transmitted from only one TP. JT involves multiple coordinated TPs transmitting the same user plane data to a particular UE with appropriate beamforming weights. TP selection (TPS) is a special form of JT where only a single TP transmits beamformed user plane data to a particular UE at any one time but the TP that transmits the user plane data may change at different time instances (e.g., between subframes).

Figure 1:
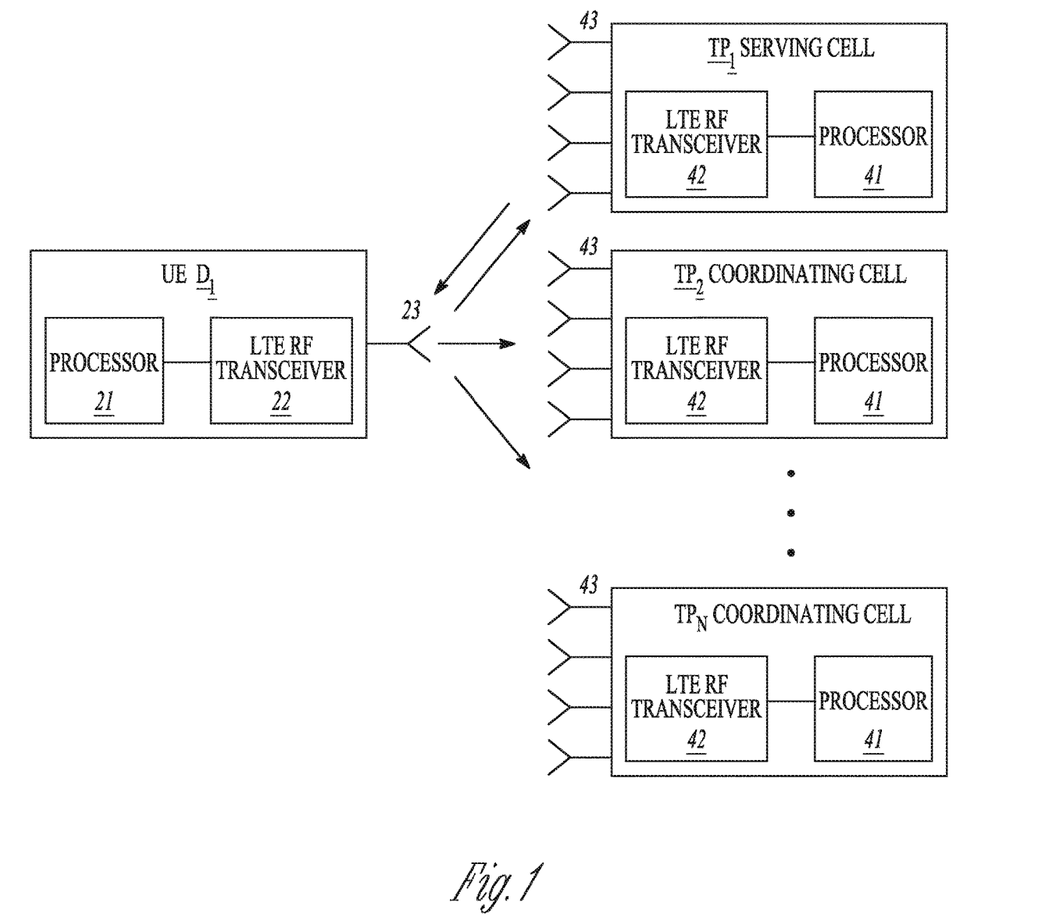
FIG. 1 illustrates an example of the components in an LTE system in accordance with some embodiments.

FIG. 1 shows an example of a UE $D_1$ which incorporates a processor 21 interfaced to radio-frequency (RF) transceiving circuitry 22 that is connected to one or more antennas 23. As the term is used herein, a processor is processing circuitry that may include memory arranged to configure the various elements of the device to perform the operations described herein. Transmission points $TP_1$ through $TP_N$, where N is the number of transmission points in the coordinating set, are shown as each incorporating a processor 41 interfaced to RF transceiving circuitry 42 that is connected to a plurality of antennas 43. The illustrated components are intended to represent any type of hardware/software configuration for providing air interfaces for LTE communication and for performing the processing functions as described herein. The transmission point $TP_1$ is shown as being the serving cell for the UE $D_1$ and may be an eNB or other type of base station. The transmission points $TP_2$ through $TP_N$ are non-serving CoMP coordinating cells and may be either base stations or RRHs operated by eNBs. eNBs may communicate with one another via a standardized X2 interface, while RRHs are typically connected to an eNB by an optical fiber link. By means of these communications links, the TPs may coordinate their transmissions and share channel state information received from a UE as described below.

Figure 2:
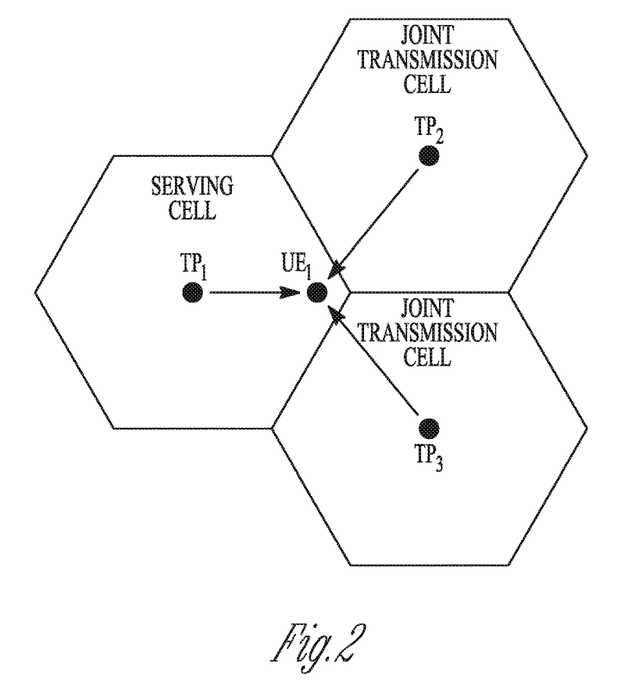
FIG. 2 illustrates the operation of downlink joint transmission coordinated multi-point according to some embodiments.
Figure 3:
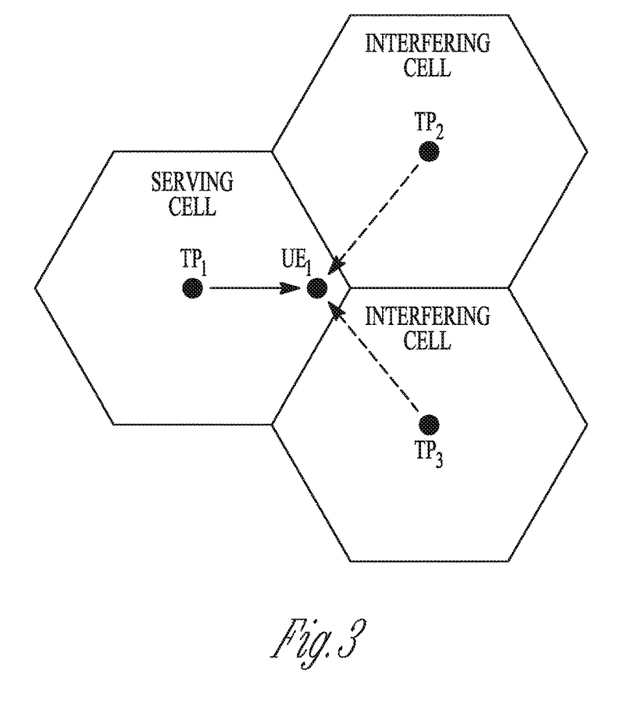
FIG. 3 illustrates the operation of downlink coordinated scheduling and coordinated beamforming coordinated multi-point according to some embodiments.

A main purpose of CoMP is to deal with the interference problem experienced by terminals at the edge area of cells. FIGS. 2 and 3 illustrate the operation of downlink CoMP for cases of JT and CS/CB, respectively. In FIG. 2, the serving cell $TP_1$ and the other coordinating cells $TP_2$ and $TP_3$ all jointly transmit to the cell edge terminal $UE_1$. By coherently or non-coherently combining the joint transmissions, the reception power at the terminal is increased. In FIG. 3, the coordinating cells $TP_2$ and $TP_2$ coordinate their antenna weightings and scheduling of downlink transmissions to terminals other than $UE_1$ in manner that reduces the interference at $UE_1$. In order to perform either of these functions, as well to select the optimum configuration of TPs, the serving cell needs to know the downlink channel from each TP to the target UE. LTE provides reference signals that may be used by a UE to obtain downlink channel state information (CSI) for a transmitting cell, referred to as channel state information reference signals (CSI-RS). The UE may then feedback the CSI thus obtained to the serving cell in the form of a CSI report.

CSI-RS are transmitted using REs otherwise allocated to the PDSCH with a configurable periodicity and spanning the entire transmit band. Up to eight CSI-RS, each corresponding to a different antenna port, may be transmitted by a cell. A UE may use the CSI-RS to estimate the channel and produce a CSI report that is fed back to the serving cell via the PUCCH or PUSCH. A channel state information report may include a channel quality indicator (CQI) that represents the highest modulation and coding scheme that could be used in the channel without exceeding a specified error rate, a rank indicator (RI) that represents the number of spatial multiplexing layers that could be used in the channel, a precoding matrix indicator (PMI) that represents a preferred antenna weighting scheme for transmitting to the UE, and a sub-band (SB) indicator that represents the subcarriers preferred by the UE. In order to configure a UE to receive and process reference signals and to provide appropriate feedback in the form of channel state information reports, the eNB signals the UE in the control plane using the RRC protocol. An RRC message that transmits CSI-RS configuration information originates in the RRC layer of the eNB and, after traversing the protocol layers, is then transmitted to the UE via the PDSCH. The UE then processes the message at its corresponding RRC layer.

The different multi-antenna transmission schemes used in LTE correspond to different transmission modes of which there are currently ten defined. These transmission modes are designated TM1 through TM10 and differ with respect of the specific structure of the antenna mapping and also with respect to which reference signals are assumed to be used for demodulation and how CSI is acquired by the UE and fed back to the eNB. In Release 11 of the LTE specifications, transmission mode 10 (TM10) was introduced. TM10 supports two concepts: multiple CSI feedback reporting and interference measurements on the dedicated interference measurement (IM) resource. The concept of multiple CSI feedback was introduced to facilitate accurate link adaptation for different coordination decisions made in CoMP systems. Such reporting is supported by configuration of one or multiple CSI processes, where CSI process is defined as combination of non-zero power (NZP) CSI-RS resource used for channel estimation and CSI-IM resource used for interference measurements. NZP CSI-RS and CSI-IM resources may be transmitted periodically in downlink subframes with minimum periodicity of 5 ms (5 subframes). The actual periodicity is defined by RRC parameter subframeConfig described in section 6.10.5.3 of 3GPP document TS 36.211 as shown in Table I below:

TABLE I

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

The location of the CSI-RS and CSI-IM resources within a subframe is also configured via the RRC parameter resourceConfig as described in Section 6.10.5.3 of TS 36.211.

Typically, there are a large number of CSI-IM resources used by the network to reflect a variety of the possible coordination decisions within the coordination area. The number of possible coordination decisions rapidly increases with number of coordinating cells. For a given UE, however, only a subset of CSI-IM resources is typically required to measure different interference combinations at the UE. To create the desired interference conditions for each coordination decision, each CSI-IM resource is typically protected by zero power (ZP) CSI-RS resource that can be used by one or more transmission point(s). Therefore, the transmission of a CSI-IM resource is associated with additional overhead due to NZP CSI-RS resource transmission, where the amount of overhead increases with the number of coordinated cells.

LTE-A supports two types of CSI reporting: periodic on the PUCCH and aperiodic on the PUSCH. Periodic CSI reporting is mainly used to indicate the channel quality of the downlink channel at the UE on a long-term basis. Periodic CSI is provided by the UE in accordance with a predefined reporting time schedule configured by the serving cell using higher layer signaling (e.g., RRC signaling). Periodic CSI usually is not used to assist in multiple coordination decisions. In contrast, aperiodic CSI reporting is used to provide more detailed reporting in a single reporting instance based on the dynamic CSI request triggered by the serving cell using an uplink DCI format (i.e, DCI that contains an uplink grant for the UE), or a random access response (RAR) that allocates uplink resources to the UE during a random access procedure. The aperiodic CSI reporting is used to assist link adaptation for multiple coordination decisions. Therefore, enhancements to multiple CSI feedback reporting using aperiodic CSI triggering should be considered.

The aperiodic nature of CSI requests and the periodic structure of NZP CSI-RS and CSI-IM transmissions introduce some issues, which can be summarized as follows. Firstly, there are additional memory requirements at the UE due to need for buffering of the channel and interference measurements obtained from NZP CSI-RS and CSI-IM resources. The UE always needs to store the latest channel and interference measurements for potential CSI calculation and reporting as a response to a CSI request from the serving cell. Secondly, there is additional overhead in the PDSCH due to periodical CSI-IM and CSI-RS transmissions where the CSI-IM and NZP CSI-RS resources consume some of the PDSCH resources even when the channel and interference measurements may not be needed. Thirdly, there are artificial shifts of CSI requests to the subframes with transmissions of NZP CSI-RS and CSI-IM resources to obtain the latest channel and interference measurements. It should also be noted that periodic structure of NZP CSI-RS and CSI-IM transmissions is difficult to support in LTE-A with licensed assisted access, due to support of co-existence mechanisms with other technologies such as Wi-Fi. Such co-existence mechanisms (e.g., listen before talk (LBT)) introduce periods where LTE-A transmissions including NZP CSI-RS and CSI-IM would not be possible.

Described herein are enhancements to NZP CSI-RS and CSI-IM transmissions to overcome the issues discussed above by employing dynamic transmission of CSI-IM resources and NZP CSI-RS for a CSI process in a subframe in accordance with a received CSI request for CSI process (es). In one embodiment NZP CSI-RS and CSI-IM resources are transmitted for CSI processes and requested for CSI feedback in the same subframe where an uplink format DCI or RAR with a CSI request has been received by the UE. In another embodiment NZP CSI-RS and CSI-IM resources are transmitted for CSI processes in the CSI reference resource. The CSI reference resource is this embodiment may occur in the same or later downlink subframe relative to subframe where DCI with CSI request has been received by the UE, but not earlier than four subframes before the CSI reporting to provide sufficient time for CSI calculation at the UE. A new CSI process definition may be provided that includes configuration of the NZP CSI-RS and CSI-IM resources within downlink subframe without preconfigured time domain transmissions (i.e., without a preconfigured subframe periodicity). For example, NZP CSI-RS and CSI-IM resources may be configured with resourceConfig only, and the time domain (downlink subframe) location of CSI-IM and NZP CSI-RS may then be determined by the CSI request.

Compared to the existing approach for NZP CSI-RS and CSI-IM transmissions defined in Release 11, the approach described herein has a number of advantages. There is no need to buffer and store channel and interference measurements as the measurement and CSI calculation are performed in the same subframe where CSI request is received. There is a smaller overhead due to CSI-IM and NZP CSI-RS resource transmissions as NZP CSI-RS and CSI-IM resources are transmitted only when CSI report is requested.

Also, flexible time-domain CSI requests from eNB means that the eNB has more flexibility to send CSI request at any subframe.

Figure 4:
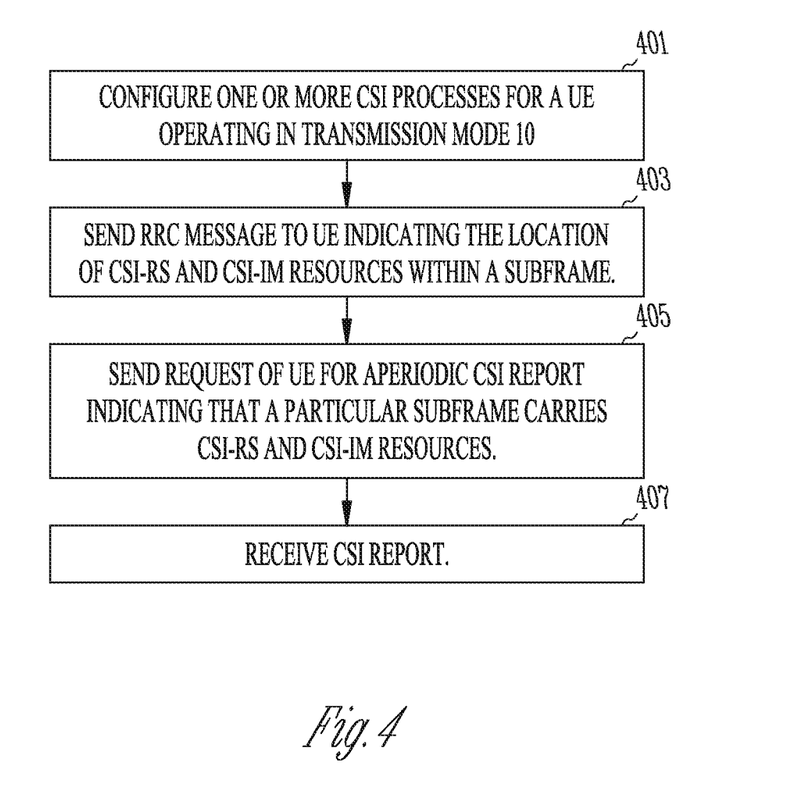
FIG. 4 illustrates a procedure followed by an eNB according to some embodiments to implement dynamic transmission of channel state information resources.

FIG. 4 illustrates a procedure followed by an eNB according to one embodiment to implement dynamic transmission of NZP CSI-RS and CSI-IM resources. At stage 401, the eNB configures one or more CSI (channel state information) processes for a UE operating in transmission mode 10 to use for reporting CSI to the eNB. The CSI process includes one or more non-zero power CSI reference signal (NZP CSI-RS) resources and one or more CSI interference measurement) (CSI-IM) resources. At stage 403, the eNB sends the UE via RRC signaling an indication as to which resource elements within a downlink subframe carrying NZP CSI-RS and CSI-IM resources are allocated to NZP CSI-RS and CSI-IM. The RRC parameter resourceConfig may be used for this purpose. At stage 405, the eNB sends a CSI request using physical layer control signaling instructing the UE to send an aperiodic CSI report that indicates in the same subframe which downlink subframe carries NZP CSI-RS and CSI-IM resources. At stage 407, the eNB receives the requested CSI report based upon the dynamically transmitted CSI resources.

Figure 5:
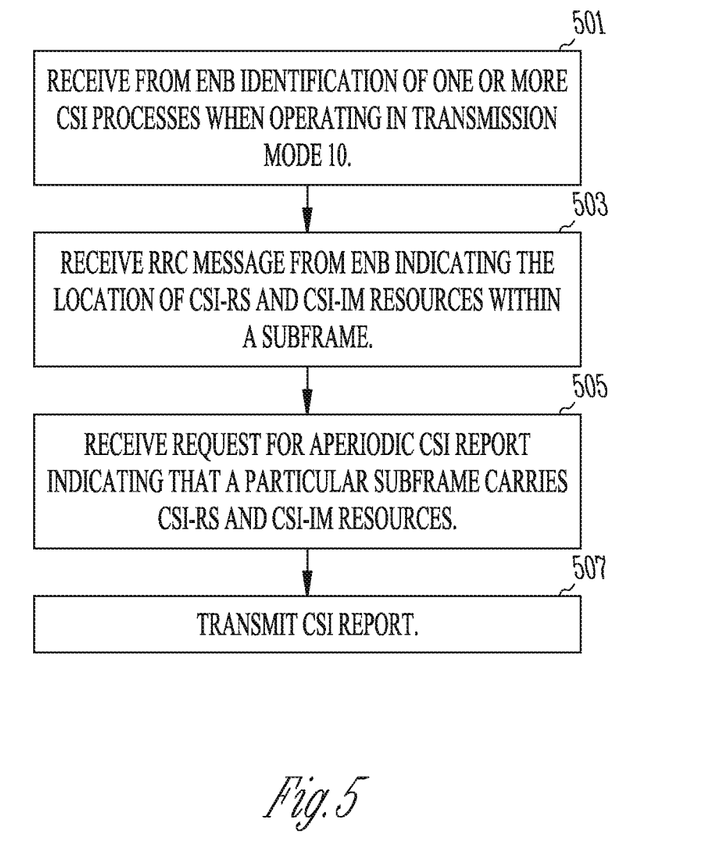
FIG. 5 illustrates a procedure followed by a UE according to some embodiments in responding to requests for channel state information reports.

FIG. 5 illustrates a procedure followed by a UE according to one embodiment in responding to requests for CSI reports based upon dynamically transmitted CSI resources. At stage 501, the UE receives via RRC signaling from the serving eNB an identification of one or more CSI processes for which the UE is to send CSI reports. At stage 503, the UE receives via RRC signaling an indication as to which resource elements within a downlink subframe carrying NZP CSI-RS and CSI-IM resources corresponding to a CSI process are allocated to those resources. At state 505, the UE receives a CSI request from the eNB using physical layer control signaling that instructs the UE to send an aperiodic CSI report and that indicates in the same subframe which downlink subframe carries NZP CSI-RS and CSI-IM resources. At stage 507, the UE sends the requested CSI report via the PUSCH.

Example Embodiments

In Example 1, an apparatus for an eNB (evolved Node B), comprises: a radio transceiver for communicating with UEs (user equipments); processing circuitry to: configure one or more CSI (channel state information) processes for a UE operating in transmission mode 10 to use for reporting CSI to the eNB, wherein a CSI process includes one or more non-zero power CSI reference signal (NZP CSI-RS) resources and one or more CSI interference measurement) (CSI-IM) resources; indicate to the UE which resource elements within a downlink subframe carrying NZP CSI-RS and CSI-IM resources are allocated to NZP CSI-RS and CSI-IM using radio resource control (RRC) signaling; and, indicate to the UE that a particular downlink subframe carries NZP CSI-RS and CSI-IM resources using physical layer control signaling.

In Example 2, the subject matter of any of the preceding examples may include processing circuitry to indicate to the UE which resource elements are allocated to NZP CSI-RS by RRC signaling of a resourceConfig parameter that determines the resource elements for NZP CSI-RS within a downlink subframe.

In Example 3, the subject matter of any of the preceding examples may include processing circuitry to indicate to the UE which resource elements are allocated for CSI-IM by RRC signaling of a resourceConfig parameter that determines the resource elements for CSI-IM within a downlink subframe.

In Example 4, the subject matter of any of the preceding examples may include processing circuitry to indicate to the UE that a particular downlink subframe carries NZP CSI-RS and CSI-IM resources in a subframe that contains a CSI request instructing the UE to send an aperiodic CSI report.

In Example 5, the subject matter of any of the preceding examples may include processing circuitry to include the indication that a particular downlink subframe carries NZP CSI-RS and CSI-IM resources in downlink control information (DCI) transmitted over the physical downlink control channel (PDCCH) that contains an uplink scheduling grant for the UE.

In Example 6, the subject matter of any of the preceding examples may include processing circuitry to include the indication that a particular downlink subframe carries NZP CSI-RS and CSI-IM resources as part of a random access response (RAR) transmitted over the physical downlink control channel (PDCCH) that contains an uplink scheduling grant for the UE.

In Example 7, the subject matter of any of the preceding examples may include processing circuitry to transmit NZP CSI-RS and CSI-IM resources in the same downlink subframe that a CSI request for the aperiodic CSI report is transmitted.

In Example 8, the subject matter of any of the preceding examples may include processing circuitry to transmit NZP CSI-RS and CSI-IM resources in a downlink subframe that corresponds to a CSI reference resource.

In Example 9, the subject matter of any of the preceding examples may include processing circuitry such that the downlink subframe corresponding to the CSI reference resource occurs in the same or later downlink subframe relative to the subframe with the request for the aperiodic CSI report.

In Example 10, the subject matter of any of the preceding examples may include processing circuitry such that the downlink subframe corresponding to the CSI reference resource occurs no fewer than four subframes before a subframe in which the UE is to transmit the aperiodic CSI report.

In Example 11, an apparatus for UE (user equipment) comprises: a radio transceiver for communicating with an eNB (evolved Node B); processing circuitry to: when operating in transmission mode 10, receive from the eNB an indication of one or more CSI (channel state information) processes to use for reporting CSI to the eNB, wherein a CSI process includes one or more non-zero power CSI reference signal (NZP CSI-RS) resources and one or more CSI interference measurement) (CSI-IM) resources; receive from the eNB via radio resource control (RRC) signaling an indication as to which resource elements within a downlink subframe carrying NZP CSI-RS and CSI-IM resources are allocated to NZP CSI-RS and CSI-IM; receive from the eNB via physical layer control signaling an indication that a particular downlink subframe carries NZP CSI-RS and CSI-IM resources in conjunction with a request for an aperiodic CSI report; transmit the aperiodic CSI report based upon the NZP CSI-RS and CSI-IM resources as indicated by physical layer control signaling.

In Example 12, the subject matter of any of the preceding examples may include processing circuitry to receive from the eNB via RRC signaling an indication as to which resource elements are allocated to NZP CSI-RS by a resourceConfig parameter that determines the resource elements for NZP CSI-RS within a downlink subframe.

In Example 13, the subject matter of any of the preceding examples may include processing circuitry to receive from the eNB via RRC signaling an indication as to which resource elements are allocated for CSI-IM by a resourceConfig parameter that determines the resource elements for CSI-IM within a downlink subframe.

In Example 14, the subject matter of any of the preceding examples may include processing circuitry to receive from the eNB an indication that a particular downlink subframe carries NZP CSI-RS and CSI-IM resources in a subframe that contains a CSI request instructing the UE to send an aperiodic CSI report.

In Example 15, the subject matter of any of the preceding examples may include processing circuitry to receive the indication that a particular downlink subframe carries NZP CSI-RS and CSI-IM resources in downlink control information (DCI) transmitted over the physical downlink control channel (PDCCH) that contains an uplink scheduling grant for the UE.

In Example 16, the subject matter of any of the preceding examples may include processing circuitry to receive the indication that a particular downlink subframe carries NZP CSI-RS and CSI-IM resources as part of a random access response (RAR) transmitted over the physical downlink control channel (PDCCH) that contains an uplink scheduling grant for the UE.

In Example 17, the subject matter of any of the preceding examples may include processing circuitry to receive NZP CSI-RS and CSI-IM resources in the same downlink subframe that a CSI request for the aperiodic CSI report is transmitted.

In Example 18, the subject matter of any of the preceding examples may include processing circuitry to receive NZP CSI-RS and CSI-IM resources in a downlink subframe that corresponds to a CSI reference resource.

In Example 19, the subject matter of any of the preceding examples may include processing circuitry such that the downlink subframe corresponding to the CSI reference resource occurs in the same or later downlink subframe relative to the subframe with the request for the aperiodic CSI report.

In Example 20, the subject matter of any of the preceding examples may include processing circuitry such that the downlink subframe corresponding to the CSI reference resource occurs no fewer than four subframes before a subframe in which the UE is to transmit the aperiodic CSI report.

In Example 21, a non-transitory computer-readable storage medium contains instructions for execution by one or more processors of an eNB to perform operations to configure the eNB perform any of the functions performed by the processing circuitry recited in Examples 1 through 10.

In Example 22, a non-transitory computer-readable storage medium contains instructions for execution by one or more processors of a UE to perform operations to configure the UE perform any of the functions performed by the processing circuitry recited in Examples 11 through 20.

In Example 23, method for operating an eNB comprises any of the functions performed by the processing circuitry as recited in Examples 1 through 10.

In Example 24, method for operating a UE comprises any of the functions performed by the processing circuitry as recited in Examples 11 through 20.

In Example 25, an eNB comprises any of the apparatus as recited in Examples 1 through 10.

In Example 26, a UE comprises any of the apparatus as recited in Examples 11 through 20

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

In some embodiments, the UE may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

One or more of the functional elements of a UE or eNB may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, a UE or eNB (FIG. 1) and may be configured to transmit and/or receive orthogonal frequency division multiplexed (OFDM) communication signals over a multicarrier communication channel in accordance with an orthogonal frequency division multiple access (OFDMA) technique. The OFDM signals may comprise a plurality of orthogonal subcarriers. In some broadband multicarrier embodiments, the UEs and eNBs may be part of a cellular broadband wireless access (BWA) network communication network, such a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect.

In some other embodiments, the UE or eNB may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a user equipment (UE), the apparatus comprising:
   one or more processors; and
   memory;
   wherein the one or more processors are configured to:
      decode radio-resource control (RRC) signalling, the RRC signalling including channel state information (CSI) measurement configuration information indicating non-zero power CSI reference signal (NZP-CSI-RS) resources for channel measurement and CSI interference measurement (CSI-IM) resources for interference measurement, the RRC signalling further indicating an offset;
      configure the UE for use of aperiodic CSI reference signals (CSI-RS) with aperiodic report triggering in response to the CSI measurement configuration information;
      decode downlink control information (DCI) that includes a CSI request and an uplink grant;
      trigger CSI reporting in response to the CSI request;
      configure the UE to use CSI-RS resources in a portion of a subframe relative to the DCI based on the offset, wherein the configuration causes the UE to use the NZP-CSI-RS resources, in the portion of the subframe, for channel measurement, and to use the CSI interference measurement (CSI-IM) resources, in the portion of the subframe, for interference measurement, wherein the configuration further causes the UE to use the CSI-RS resources in a slot of a subframe, the slot being offset from the DCI based on the offset; and
      encode an aperiodic CSI report, based on the measurements, in accordance with the uplink grant received in the DCI, for transmission carried on a physical uplink shared channel (PUSCH), wherein the memory is configured to store the aperiodic CSI report.

2. The apparatus of claim 1, wherein the subframe containing the CSI-RS resources is no earlier than four subframes before the aperiodic CSI report is transmitted.

3. The apparatus of claim 1, wherein the RRC signalling further indicates that the NZP CSI-RS and CSI-IM resources do not have a preconfigured subframe periodicity.

4. The apparatus of claim 1, wherein the uplink grant is received in a random-access response (RAR).

5. The apparatus of claim 1, wherein the one or more processors are further configured to configure the UE for transmission mode 10.

6. The apparatus of claim 5, wherein, when configured for transmission mode 10, the UE is further configured to decode an indication of one or more CSI processes for CSI reporting for transmission mode 10, the indicated one or more CSI processes including one or more NZP CSI-RS resources and one or more CSI-IM resources.

7. The apparatus of claim 1, further comprising transceiver circuitry.

8. The apparatus of claim 7, further comprising two or more antennas coupled to the transceiver circuitry.

9. A non-transitory computer-readable storage medium that stores instructions, wherein the instructions, when executed by one or more processors of a user equipment (UE), configure the UE to:
   decode radio-resource control (RRC) signalling, the RRC signalling including channel state information (CSI) measurement configuration information indicating non-zero power CSI reference signal (NZP-CSI-RS) resources for channel measurement and CSI interference measurement (CSI-IM) resources for interference measurement, the RRC signalling further indicating an offset;
   configure the UE for use of aperiodic CSI reference signals (CSI-RS) with aperiodic report triggering in response to the CSI measurement configuration information;
   decode downlink control information (DCI) that includes a CSI request and an uplink grant;
   trigger CSI reporting in response to the CSI request;
   configure the UE to use CSI-RS resources in a portion of a subframe relative to the DCI based on the offset, wherein the configuration causes the UE to use the NZP-CSI-RS resources, in the portion of the subframe, for channel measurement, and to use the CSI interference measurement (CSI-IM) resources, in the portion of the subframe, for interference measurement, wherein the configuration further causes the UE to use the CSI-RS resources in a slot of a subframe, the slot being offset from the DCI based on the offset; and
   encode an aperiodic CSI report, based on the measurements, in accordance with the uplink grant received in the DCI, for transmission carried on a physical uplink shared channel (PUSCH).

10. The computer-readable storage medium of claim 9, wherein the subframe containing the CSI-RS resources is no earlier than four subframes before the aperiodic CSI report is transmitted.

11. The computer-readable storage medium of claim 9, wherein the RRC signaling further indicates that the NZP CSI-RS and CSI-IM resources do not have a preconfigured subframe periodicity.

12. The computer-readable storage medium of claim 9, wherein the uplink grant is received in a random-access response (RAR).

13. The computer-readable storage medium of claim 9, wherein the instructions, when executed by the one or more processors, further configure the UE for transmission mode 10, wherein, when configured for transmission mode 10, the UE is further configured to decode an indication of one or more CSI processes for CSI reporting for transmission mode 10, the indicated one or more CSI processes including one or more NZP CSI-RS resources and one or more CSI-IM resources.

14. A non-transitory computer-readable storage medium that stores instructions for execution by one or more processors of node B (NB) to perform operations to configure the NB to:
   encode radio-resource control (RRC) signalling for transmission to a user equipment (UE), the RRC signalling including channel state information (CSI) measurement configuration information, the RRC signalling to configure the UE for use of aperiodic CSI reference signals (CSI-RS) with aperiodic report triggering in response to the CSI measurement configuration information, the RRC signalling indicating non-zero power CSI reference signal (NZP-CSI-RS) resources for channel measurement and CSI interference measurement (CSI-IM) resources for interference measurement, the RRC signalling further indicating a triggering offset;
   encode downlink control information (DCI), for transmission to the UE, the DCI to include a CSI request and an uplink grant, the CSI request to trigger CSI reporting by the UE, wherein the DCI is to configure the UE to use CSI-RS resources in a portion of a subframe relative to the DCI as indicated by the triggering offset, wherein the DCI is to further configure the UE to use the CSI-RS resources in a slot of a subframe, the slot being offset from the DCI based on the triggering offset; and decode an aperiodic CSI report received from the UE, the aperiodic CSI report including measurements from the UE, the aperiodic CSI report received in accordance with the uplink grant indicated in the DCI, the aperiodic CSI report received on a physical uplink shared channel (PUSCH).

15. The apparatus of claim 1, wherein time domain location of the NZP-CSI-RS resources and CSI-IM resources are dynamically determined by the CSI request.

16. The apparatus of claim 1, wherein the CSI-RS resources are in a CSI reference resource.

17. The computer-readable storage medium of claim 9, wherein time domain location of the NZP-CSI-RS resources and CSI-IM resources are dynamically determined by the CSI request.

18. The computer-readable storage medium of claim 14, wherein time domain location of the NZP-CSI-RS resources and CSI-IM resources are dynamically determined by the CSI request.

19. The computer-readable storage medium of claim 14, wherein the subframe containing the CSI-RS resources is no earlier than four subframes before the aperiodic CSI report is transmitted.

20. The computer-readable storage medium of claim 14, wherein the RRC signalling further indicates that the NZP CSI-RS and CSI-IM resources do not have a preconfigured subframe periodicity.

\* \* \* \* \*